June 24, 1930.  A. A. THOMAS  1,766,965
THERMOSTAT
Filed April 8, 1927
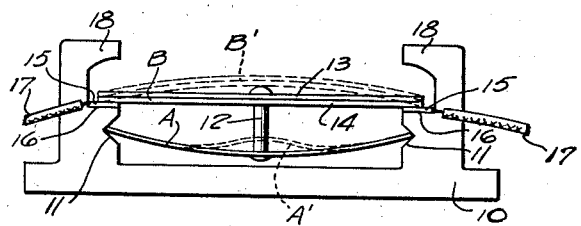
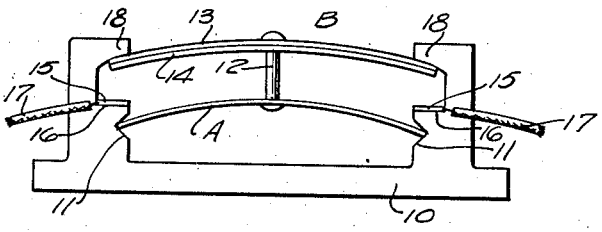
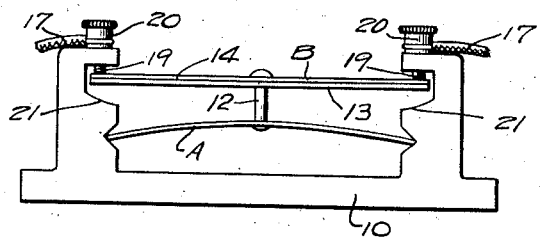
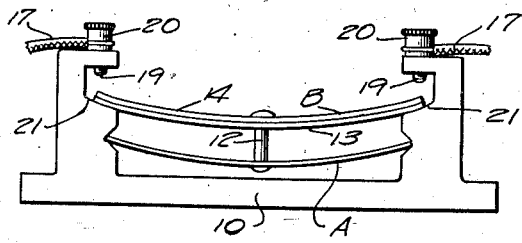
INVENTOR
Adolph A. Thomas Patented June 24, 1930

1,766,965

UNITED STATES PATENT OFFICE

ADOLPH A. THOMAS, OF NEW YORK, N. Y.

THERMOSTAT

Application filed April 8, 1927. Serial No. 181,988.

My invention is for a new and improved thermostat characterized by simplicity and compactness of construction and capable of operating with a snap action for abruptly opening an electric circuit or performing any other useful function.

The thermostat of my invention consists of only two parts, a thermostatic element and a buckling spring member. According to one feature of my invention, thermostatic element is mounted on and supported by the spring member, which may be a curved leaf spring or an elastic concave disk capable of abruptly changing its shape under the action of external force. The arrangement of these two parts is such that when the thermostatic element is heated to a certain temperature, it exerts pressure on the bowed spring member until the latter snaps into a position of reverse curvature. The sudden reversing movement of the spring member carries the thermostatic element along with it, and this bodily movement of the element may be utilized to break an electric circuit or to effect any other practical operation. As the thermostatic elements cools, it exerts pressure on the spring member in an opposite direction until the parts automatically snap back to initial position.

Viewed in another aspect, my invention comprises a thermostatic element and a bowed spring member so connected that the pressure exerted by the element at predetermined temperature snaps the snap spring member into reverse curvature. When my thermostat is used to control an electric circuit, the thermostatic element normally engages contact means supported independently of the two movable parts. The tension of the spring member resists the tendency of the thermostatic element to move under variations of temperature until a point is reached when the increased pressure of the element on the spring member suddenly snaps the latter into reverse curvature. The reversing operations of the spring member release the strained thermostatic element for abrupt movement away from and back to the contact means, which may be connected in an electric circuit. The closed circuit is not broken and the opened circuit is not closed until the spring member snaps from one position to the other.

In the accompanying drawings I have illustrated two practical examples of my invention, without thereby intending any limitation or restriction on the fundamental idea here involved. I shall now proceed to describe the drawings in detail, so that those who are versed in this art may clearly and fully understand my invention. In these drawings—

Fig. 1 shows an electric thermostat constructed in accordance with my invention, the parts being shown in normal position, except that the dotted lines roughly indicate the initial movements of the parts under the action of heat;

Fig. 2 shows the same construction as Fig. 1, except that the parts are in final position after the circuit has been abruptly opened;

Fig. 3 shows a slightly modified construction with the parts in normal circuit-closing position; and Fig. 4 shows the same construction as Fig. 3, with the parts in final position after the abrupt opening of the circuit.

Before proceeding with a detailed description of the drawings, I want to explain that I have made the four views as clear and simple as possible by purposely exaggerating the dimensions and relative proportions of the parts. In fact, the drawings have been made diagrammatic by avoiding unnecessary structural details.

Referring to Figs. 1 and 2, there is a base or support 10, which may conveniently be cast or shaped as a single piece, preferably of strong insulating material, although it may also be made of metal. On the support 10 is mounted a bowed spring member A, which may be a curved leaf spring or an elastic concave disk. In either case, the part A is so constructed that it abruptly changes its shape by reversing its curvature under the action of sufficient external pressure. A simple way of mounting the spring member A on support 10 is by inserting the ends in notches or grooves 11. If the spring member A is in the form of a concave disk or diaphragm, the supporting means 11 is in the form of an annular seat adapted to engage and retain the periphery of the disk.

A thermostat bar B is connected at its center to the central portion of spring member A by a pin or rivet 12, or in any other practical way. When I say that the parts A and B are connected together at the center, I do not necessarily mean their mathematical center, but at or near their central points. The thermostat bar B may be of the usual bimetallic construction, consisting of a brass strip 13 and an iron strip 14 (or equivalent metals) rigidly secured together over their entire length. The supporting base or frame 10 carries a pair of electric contacts 15, which may be small plates mounted on extensions or ledges 16 of the base. Circuit conductors 17 are connected to contacts 15. The tension of the arched spring member A is such that normally the ends of thermostat bar B are pressed firmly against contacts 15, thereby closing an electric circuit. If the supporting frame 10 is of metal, the electrical parts must be properly insulated.

The operation of the thermostat shown in Figs. 1 and 2 is the following: As the thermostat bar B reaches a certain temperature, it begins to expand by curving upwardly at the center, as roughly indicated by dotted lines B' in Fig. 1. During this initial movement of thermostat bar B, its ends remain in firm engagement with contacts 15, since the tendency of spring member A is to pull the bar downwardly. The dotted lines A' in Fig. 1 roughly indicate the initial movement of spring member A when the thermostat bar begins to curve upwardly at the center. It will, of course, be understood that the dotted lines A' and B' indicate movements on an exaggerated scale. Actually, the initial thermostatic movements of the bar A are so small as to be imperceptible to the naked eye; indeed, they are not so much physical movements as they are strong tendencies of the bar to move due to internal stresses set up by the heat. Therefore, when I speak of the thermostatic movements of the bar, I do not necessarily mean actual physical movements, but also include the tendency to move under internal stresses. As the thermostat bar B becomes hotter, the continued upward movement at the center of the bar increases the pressure or tension on the central portion of spring member A until the latter suddenly snaps into a position of reverse curvature, thereby abruptly carrying the thermostat bar B away from contacts 15 against a pair of stops 18, which may be part of the supporting frame 10. This sudden bodily movement of the thermostat bar B by the reversing spring member A breaks the electric circuit with a snap action that eliminates arcing.

If there is any tendency of the thermostat bar to continue its expanding movement after reaching the position shown in Fig. 2 until it has sufficiently cooled off, such movement would be resisted by the inherent tension of spring member A, as well as by the stops 18. In any event, there will be no danger of the ends of bar B touching the contacts 15 until after the spring member A snaps back into normal circuit-closing position. It will be understood that the circuit remains closed until the spring member A in reversing its curvature jerks the ends of bar B away from contacts 15. The temperature at which this circuit-opening operation takes place, can be predetermined, as will be clear to those who are familiar with thermostats.

When the thermostat bar B begins to cool after being abruptly moved by the spring member A into the circuit-opening position shown in Fig. 2, the bar begins to straighten itself by moving down at the center. During this return of the bar to normal position, the ends brace themselves against the stops 18. As the central portion of thermostat bar B moves downwardly on decrease of temperature, the connecting pin 12 presses down on the center of spring member A until the latter suddenly snaps back to normal position, thereby pulling the bar B into sudden engagement with the contacts 15, so that the electric circuit is again closed through the thermostat bar.

Fig. 3 shows a construction slightly different from Figs. 1 and 2. In this instance, the thermostat bar B is normally pressed by spring member A against a pair of adjustable contact screws 19, which terminate in (or are otherwise connected to) binding posts 20 adapted to receive the circuit conductors 17. When the bar B is in circuit-opening position, as shown in Fig. 4, the ends of the bar rest on a pair of shoulders 21 provided on the support 10. Otherwise, what has been said about the construction and operation of Figs. 1 and 2 is fully applicable to Figs. 3 and 4, without the need of repetition. Like parts in the four figures are indicated by the same reference characters to show similarity of construction.

It will be seen from the preceding description that I have provided a snap-action thermostat of unusually simple and compact construction. Its operation is certain and positive. The thermostat bar is jerked away from the contacts to break the circuit abruptly at two points, thus providing two airgaps in series and eliminating all danger of arcing. When the thermostat bar is snapped back to normal position by the spring member, the ends of the bar are jammed tight against the contacts and held there by the spring. There are no delicately mounted parts to get out of order, and the instrument can be made for a few cents. My new thermostat may be housed in a very small space, and is therefore available for use in such electric heating appliances as flat-irons, percolators, toasters, and the like. Attention is called to the fact that the spring member A is never in circuit and is therefore not subjected to the heating action of the current although that effect may be negligible.

When I say that the spring member A may be a curved leaf spring or an elastic concave disk, I do not mean to exclude, but rather include, any other practical form of tensioned spring member or device so constructed as to change its shape or position abruptly when subjected to external force. For example, a spring-pressed toggle could be used, but it would not be so simple and perhaps not so efficient as a single leaf spring or concave disk. It is hardly necessary to say that the spring member A is of elastic metal capable of withstanding high heat without losing its temper and elasticity. The contacts 15 and 19 are so arranged relatively to the thermostat bar B that the ends of the bar do not strike the contacts after the circuit is broken, even if the bar should continue to curve due to acquired momentum or inherent stresses This is clear from Figs. 2 and 4. When I say that the contacts engage the thermostat bar I do not necessarily mean that they directly touch the thermostatic metal of the bar, for the latter may have contact heads for engaging the contacts 15 and 19. Also, in describing the thermostat bar as connected to the center of the buckling spring, I do not refer to the mathematical center but mean as close to the center as mechanical conditions permit.

Although I have described certain specific constructions, I want it understood that the basic idea of my invention may be mechanically carried out in other forms than herein set forth, without departing from the scope of the invention as defined in the appended claims. While I have described my invention in the form of an electric thermostat, in which it probably finds its greatest utility, it is manifest that, in the fundamental aspect of my invention, the abrupt movements of the thermostat bar and spring member may be utilized to effect or control the operation of any other practical instrumentality. When I say in the description and claims, that the buckling spring member prevents movements of the thermostat element until predetermined temperature limits are reached, I refer to the operative movements of the thermostat element. As I explained heretofore, there may be slight preliminary movements of the thermostat element before the buckling operation, but the fact remains that, for all practical purposes, the tensioned spring member prevents movements of the thermostat element until the required high and low temperature limits occur, whereupon those two parts operate simultaneously with a snap action.

I claim as my invention:

1. In a thermostat, the combination of a bowed spring member adapted to reverse its curvature abruptly by external force, a thermostatic element connected to and supported by said spring member, and means whereby the movements of said element under predetermined increase and decrease of temperature exert pressure on said spring member until the latter snaps into a position of reverse curvature, said thermostatic element being bodily carried along by said spring member when the latter reverses its curvature.

2. In a thermostat, the combination of a bowed spring member adapted to reverse its curvature abruptly by external force, a thermostat bar connected at its center to the center of said spring member, and means whereby the movements of said bar under predetermined increase and decrease of temperature exert pressure on said spring member until the latter snaps into a position of reverse curvature, said thermostat bar being bodily carried along by said spring member when the latter reverses its curvature.

3. In a thermostat, the combination of a bowed spring member adapted to change its shape abruptly by external force, a thermostat bar connected centrally to the central portion of said spring member and mounted on said member for bodily movement independent of its thermostatic movements, means for holding the ends of said bar during its thermostatic movement under heat from normal position, whereby said bar exerts pressure on said spring member until the latter snaps into a position of reverse curvature and carries the thermostat bar along with it, and separate means for holding the ends of said bar on cooling to enable it to snap said spring member back to normal position, the return movement of said spring member automatically carrying the thermostat bar against said first-named holding means.

4. A thermostat comprising a bowed spring member adapted to change its shape abruptly by external force, a thermostatic element secured to the center of said spring member and mounted thereon for bodily movement independent of its thermostatic movements, stop means associated with said element, said spring member normally holding said element in contact with said stop means, said thermostatic element being so arranged that under the action of heat it exerts pressure on said spring member until the latter snaps into a position of reverse curvature and thereby suddenly carries said element out of engagement with said stop means, and other stop means engaged by said element after its sudden movement by said spring member to enable said element on cooling to exert pressure on said spring member and snap it back to normal position, the movement of said spring member to normal position automatically returning said thermostatic element into engagement with said first mentioned stop means.

5. A thermostat comprising a bowed spring member adapted to change its curvature abruptly by external force, a thermostatic element mounted on said spring member and supported thereby, stops associated with said element, said spring member normally holding said element pressed against said stops, said element on reaching a certain high temperature exerting pressure on said spring member until the latter snaps into a position of reverse curvature, this sudden reversing movement of the spring member jerking the thermostatic element away from said stops, and means whereby said element on cooling exerts pressure on said spring member until the latter snaps back to normal position and carries said element into engagement with said contact means.

6. A thermostat comprising a bowed spring member adapted to change its shape abruptly by external force, a thermostat bar secured at its center to the center of said spring member, whereby said bar is mounted on said spring member for bodily movement independent of its thermostatic movements, a pair of stops associated with said bar, said spring normally holding the ends of said bar pressed against said stops, said thermostat bar being so arranged that under the action of heat it exerts pressure centrally on said spring member until the latter snaps into a position of reverse curvature and thereby carries the ends of said bar away from said stops, and other stops engaged by the ends of said thermostat bar after its sudden movement by said spring member, said other stops enabling the central portion of said bar on cooling to exert pressure on said spring member and snap it back to normal position, the movement of said spring member to normal position automatically returning said bar into engagement with said first-mentioned stops.

7. In a thermostat, the combination of a thermostat bar, a pair of stops normally engaging the ends of said bar, and means controlled by the thermostatic movements of said bar for abruptly moving the same away from and back to said stops.

8. A thermostat comprising a bowed spring member adapted to reverse its curvature abruptly by external force, a thermostatic element connected to said spring member and adapted to snap the same into reverse curvature back and forth at predetermined variations of temperature, and stop means supported independently of said parts and normally engaging the thermostatic element, which abruptly moves away from and back to said stop means when said spring member snaps into reverse curvature.

9. A thermostat comprising a bowed spring member suitably supported and adapted to change its shape abruptly by external force, a thermostat bar secured at the center to said spring member, stops normally engaging the ends of said bar, said bar at predetermined temperature exerting pressure on said spring member until the latter snaps into a position of reverse curvature and thereby jerks the ends of said bar away from said stops, and means whereby said bar on cooling causes said spring member to snap back to initial position and bring said bar into sudden engagement with said stops.

10. A thermostat element rigidly connected at its center to the center of a bowed spring member, and means for so mounting said parts that the thermostatic movements of said element snap said spring member into reverse curvature.

11. A thermostat bar connected rigidly and permanently to the center of a buckling spring supported at its ends, so that the thermostatic movements of said bar at predetermined high and low temperatures snap said spring into reverse curvature.

12. A thermostat comprising two pairs of spaced stops, a thermostat bar normally engaging one pair of stops at its ends, and means for abruptly moving said bar into engagement with the other pair of stops at predetermined high temperature, said bar on cooling automatically causing said actuating means to snap the bar back to normal position in contact with the first pair of stops.

13. In a thermostat, the combination of a pair of stops, a thermostat bar normally engaging said stops at or near its ends, and means controlled by the thermostatic movements of said bar for abruptly disengaging the latter from said stops and moving it back into engagement with said stops at predetermined changes in temperature.

14. A thermostat bar rigidly connected to a buckling spring member, and means for so mounting said parts that the thermostatic movements or pressure of said bar snap said spring member into reverse curvature.

15. A thermostat comprising a bowed spring member adapted to reverse its curvature, a thermostat bar rigidly connected to the center of said spring member to snap the same into reverse curvature at predetermined high and low temperatures, said spring member being so tensioned as to prevent thermostatic movement of said bar in response to temperature changes until said temperature limits are reached, and stops for positively limiting the movements of said spring member and thermostat bar in both directions.

16. A buckling spring carrying a thermostat bar which snaps the spring into reverse curvature at predetermined high and low temperatures.

17. The combination of a buckling spring supported at its ends, and a thermostat bar extending substantially longitudinally of said spring and secured thereto for causing it to reverse its curvature with a snap action when said bar is subjected to predetermined temperature.

18. A buckling spring having a thermostat bar mounted longitudinally thereon and in spaced relation thereto, means for securing said bar at the center to said spring, the ends of said bar being free to move relatively to the spring, and stops engaging the ends of said bar, so that the movements or pressure of the bar at predetermined high and low temperatures snap said spring into reverse curvature.

19. The combination of a thermostatic element and a buckling spring so mounted that neither part can move independently of the other in response to temperature changes, said parts being adapted to operate as a unit with a sudden snap motion at predetermined high and low temperatures, said buckling spring being adapted to reverse its curvature during said snap action.

ADOLPH A. THOMAS.